June 23, 1925.                                              1,543,124
N. H. RICKER
FREQUENCY STANDARD
Filed July 9, 1924                    2 Sheets-Sheet 1
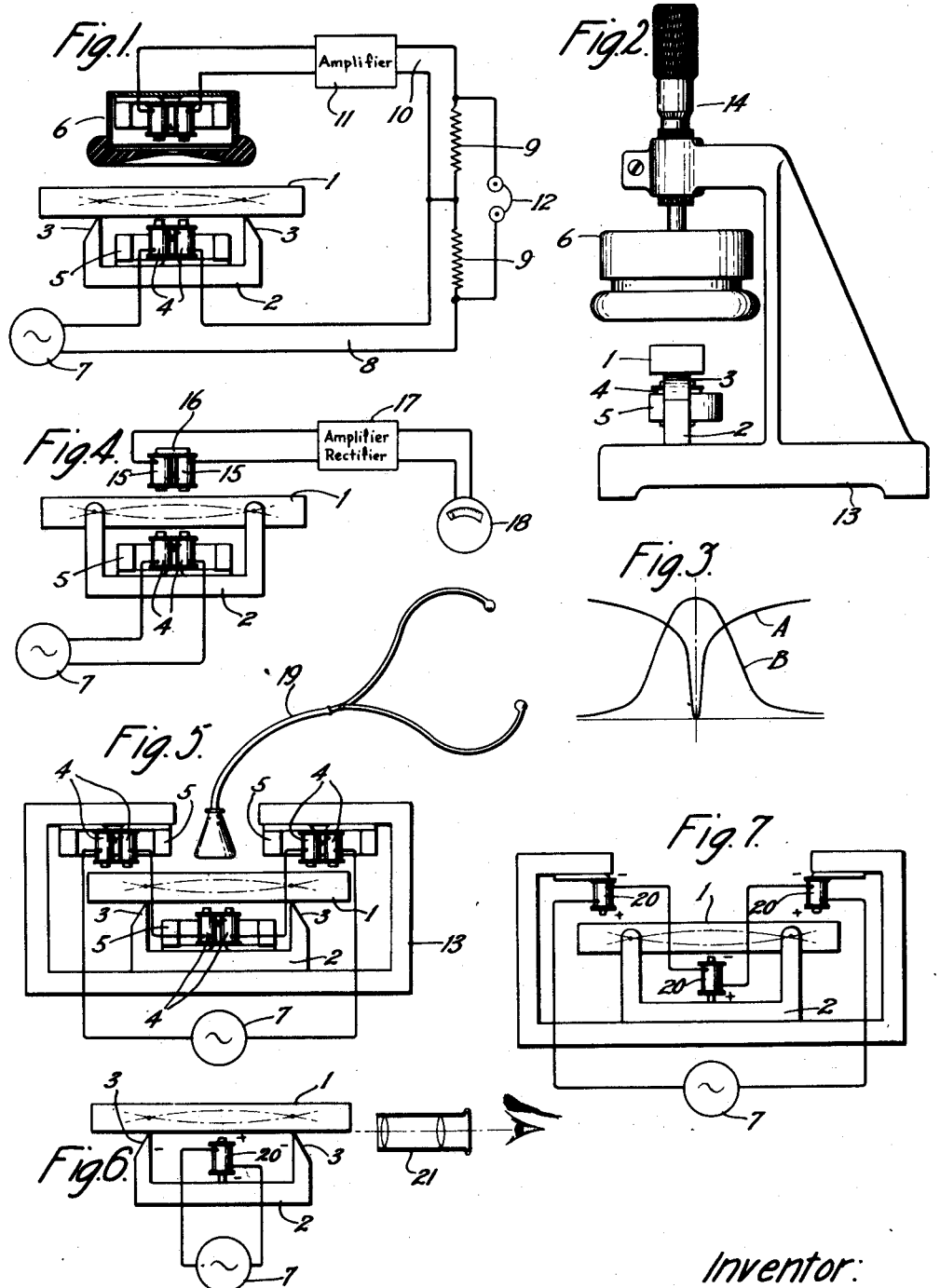
Inventor:
Norman H. Ricker,
by ⟨signature⟩ Atty.

June 23, 1925. 1,543,124
N. H. RICKER
FREQUENCY STANDARD
Filed July 9, 1924     2 Sheets-Sheet 2
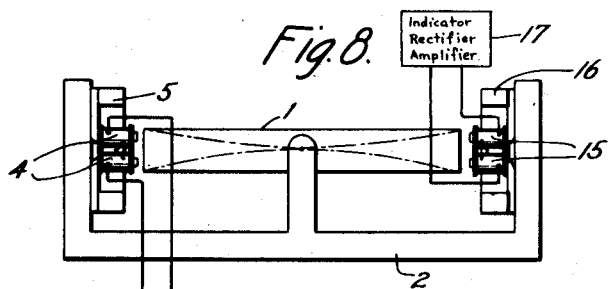
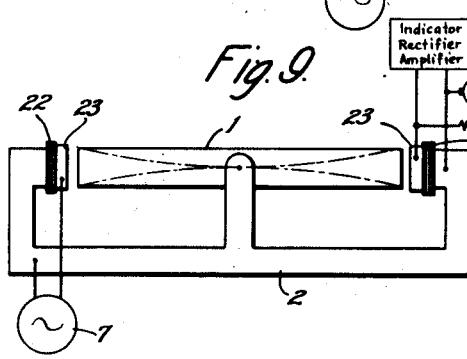
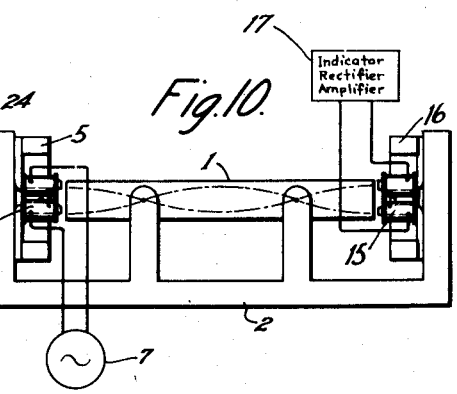
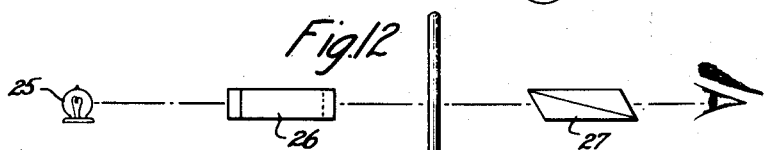
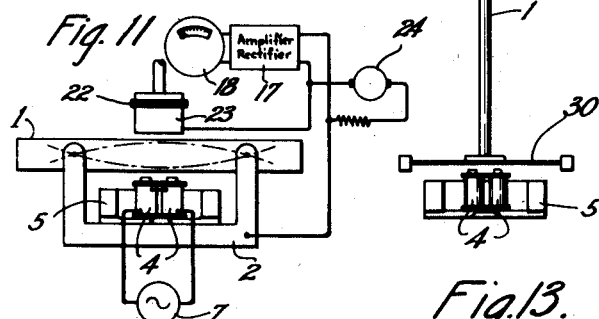
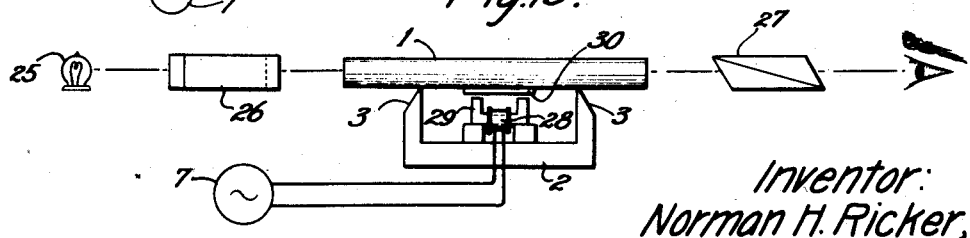
Inventor:
Norman H. Ricker,
by    Atty.

Patented June 23, 1925.

1,543,124

UNITED STATES PATENT OFFICE.

NORMAN H. RICKER, OF HOUSTON, TEXAS, ASSIGNOR TO WESTERN ELECTRIC COMPANY, INCORPORATED, OF NEW YORK, N. Y., A CORPORATION OF NEW YORK.

FREQUENCY STANDARD.

Application filed July 9, 1924. Serial No. 724,965.

*To all whom it may concern:*

Be it known that I, NORMAN H. RICKER, a citizen of the United States of America, residing at Houston, in the county of Harris, State of Texas, have invented certain new and useful Improvements in Frequency Standards, of which the following is a full, clear, concise and exact description.

This invention relates to frequency standards, and more particularly to methods of and means for setting and testing the frequencies of electrical variations.

Among the qualities which give a measure of value to frequency standards, whether electrical or otherwise, are:

1. Frequency stability.
2. Frequency selectivity.
3. Low cost.
4. Simplicity and robustness of structure.
5. Portability.
6. The ease and rapidity with which it can be used as a comparison device, consistent with accurate and positive frequency indication.
7. The extent to which the condition of equality of the two frequencies concerned in a comparison can be determined with reference to units of length, time and mass, which quantities are capable of being measured by known instruments with very great accuracy.

An object of this invention is to provide frequency standards which possess the above noted qualities to a marked degree.

Another object is the provision of methods whereby frequency standards of this type may be utilized for determining and setting the frequencies of electrical variations supplied by an alternating current source.

A further object is to provide an apparatus for accurately determining the frequencies of alternating currents supplied by an alternating current source.

A still further object is to provide a frequency selective electric transmission system which utilizes the frequency selective characteristics of a resonantly vibratory mechanical means and in which there is no electrical or magnetic coupling between the portions of the system separated by such means.

In accordance with this invention, the frequency standard utilizes as the frequency determining element a mechanically vibrating body, which has a relatively smaller decrement, and hence a relatively greater frequency selectivity than an oscillating electric circuit. The general theory of elastic vibration of bars mounted for transverse or longitudinal vibrations is disclosed, for example, in Barton's textbook on Sound, published in 1914, in which see particularly pages 237, 274 and 283.

The arrangements of the present invention are particularly adapted for use where the frequencies under investigation are of an order higher than those which can be obtained with the conventional tuning fork mountings. It is proposed to use steel or glass bars, which are caused to vibrate laterally or longitudinally at their resonant frequencies. By using the resonant frequency of vibration instead of the natural frequency, that is, the frequency which the bar would have when impulsed into vibration and permitted to vibrate freely, a more definite and less variable frequency results, since the viscosity, which is a function of the amplitude of vibration, does not enter into the equation of resonant frequency as it does in the case of natural frequency.

For the frequency range next adjacent to those for which tuning forks are available, steel bars are supported by gravity on knife edge or trunnion bearings and are transversely vibrated either electromagnetically or electrostatically. The supports are positioned at the nodal points of vibration which, when the bar is caused to vibrate at its fundamental rate, are .22418 of the length of the bars from each end. This particular type of mounting, especially the trunnion mounting, in which the bar is supported by pins passing through, or extending into, the bar at the intersections of the nodal cross-sections and the neutral plane of flexure tends to avoid friction at the points of support during flexure of the bar. This friction would have an effect similar to that of an increase of viscosity, that is, it would increase the decrement and decrease the selectivity.

Bars mounted as described above so that their ends are free to vibrate are known as "free-free" bars. Any other type of mounting, as for example, where the ends are fixed, results in a tendency for movement of the bar at its ends to be restrained, with consequent increased damping.

For higher frequencies, steel bars similarly mounted may be longitudinally vibrated. For this mode of vibration, of course, the choice as between knife edge or trunnion mounting is determined from other considerations than that of friction at the supports. As a practical matter, the choice, as between these types of mountings, is immaterial.

The bars may be mounted in such a manner as not to have discrete points of support, in which case they are not constrained to vibrate according to particular modes. It is accordingly possible, by using this kind of mounting, to cause the bar to vibrate at any one of a very wide range of frequencies. For example, a glass rod has been caused to vibrate longitudinally at frequencies of the order of several hundred kilocycles, the nodal points being distributed along the bar at intervals of about five millimeters.

The frequency standards to be hereinafter referred to have been most commonly used to set the frequency of alternating current sources. As thus used, the energy from the source is caused to drive the vibrating bar, the frequency of the source being varied until coincident with the resonant frequency of the bar. This condition may be indicated by various means, most of which depend on the fact that at the resonant frequency the bar vibrates at its maximum amplitude.

Among the methods for generating variations by and in accordance with the movements of the bar and for indicating the condition of resonance which depend on the concomitant fact of maximum amplitudes are the following: by the use of a stethoscope, the maximum amplitude of vibration being indicated by a maximum intensity of sound in the stethoscope; by observation of a maximum deflection of a meter in circuit with a coil which has an electromotive force induced therein by the motion of the vibrating body or in circuit with a condenser whose capacity is similarly varied; thirdly, directly and positively by means of a microscope and scale, a standard using this method therefore having the seventh quality listed above as desirable in a frequency standard; and lastly, if an elastic bar of transparent material is used, for example, a glass bar, advantage can be taken of the fact that an isotropic medium becomes non-isotropic when subjected to elastic strain. In this case the condition of resonance is indicated by the presence and maximum intensity of light emergent from the second of two Nicol prisms crossed with respect to each other and between which the bar is positioned.

It is of great practical importance that neither electromagnetic or electrostatic means be used together to perform the driving and indicating functions, since in either case the magnetic or electric coupling that would result to some extent, even with the greatest possible separation of circuits, would seriously interfere with operation of the indicating means. In general, it has been found that the combination of an electromagnetic drive and an electrostatic indicating means is satisfactory. Since the combination of elements in a frequency standard, except the indicating device itself, is a frequency selective transmission system in which the mechanical vibrating body is the frequency determining element, the principle may be more broadly stated by saying that in such a transmission system the two energy transforming means should not employ the same types of electric elements, as between electromagnetic and electrostatic.

An indicating method quite different in principle from those above noted depends upon the 180° shift of phase of the vibrations of a driven elastic body relative to the phase of the driving force as the frequency of the driving force changes from slightly below to slightly above the resonant frequency of the body. The sudden shift of phase may be caused to produce a momentary actuation of the needle of a meter or a momentary cessation of sound in a telephone receiver.

From the foregoing brief description it is apparent, even when not specifically pointed out, that the invention in its various forms fulfills the stated requirements for good frequency standards. The reasons therefor and additional features and objects will more fully appear from the following detailed description taken in connection with the accompanying drawings, in which Figs. 1 and 2 illustrate, respectively, a side and end view of a frequency standard comprising a steel bar mounted on knife edges at its nodal points, means for electromagnetically actuating it into transverse vibrations, and means dependent on the relative reversal of phase of the movements of the bar relative to the driving force for indicating a resonant condition.

Fig. 3 is a graphical means for illustrating the operation of the indicating means of Figs. 1 and 2.

Fig. 4 is similar to Fig. 1, but illustrates a trunnion instead of a knife edge mounting for the bar and an electromagnetic indicating means.

Figs. 5, 6 and 7 are similar to Fig. 1, but illustrate specifically different methods of applying the driving electromagnetic force, Figs. 5 and 6 also illustrating alternative means for generating electrical variations by and in accordance with the movements of the bar and for indicating resonance, the former illustrating the use of a stethoscope and the latter a microscope.

Figs. 8, 9 and 10 illustrate methods similar to those of Figs. 1 to 7, but in which the rod is vibrated longitudinally instead of transversely, Fig. 9 also showing an electrostatic driving means, which means is equally applicable to the methods of these earlier mentioned figures.

Fig. 11 illustrates a frequency standard having electromagnetic driving means and electrostatic generator means.

Figs. 12 and 13 illustrate applications of the nonisotropic transmission of light through a strained transparent medium to indicate the resonant condition of vibration.

Before proceeding to the descriptions of the specific systems, the following observations applicable generally to the systems or to one or more of the well defined groups in which they may be divided may be made.

The various frequency standards to be described have the common feature of having the vibrating body mounted so that both of its ends are free. A bar so mounted is known as a "free-free" bar.

The type of vibration which these bars exhibit, or at least that useful in their rôles as frequency standards, is that commonly described by "standing wave," since the nodes and antinodes (loops) while the bars are vibrating tend to preserve their initial positions.

The resonant frequency of such a bar or other vibrating body may be defined, as used in this specification, as the frequency which the body will have when it continuously absorbs energy from outside at such a rate as will cause it to vibrate through its maximum amplitude.

For the present purposes the equation for the resonant frequency of a longitudinally vibrated free-free bar, when vibrating in its fundamental mode, can be stated as follows:

$$F_1 = K \frac{\sqrt{q}}{\sqrt{d}L}$$

where $q$ is Young's Modulus and is, therefore, a measure of the elasticity of the material, $d$ is the volume density of the material, and L is the length of the bar.

A bar will vibrate at this frequency if fixed at its center, the bar accordingly being half a wave length long since antinodes must occur at its free ends. If the bar is fixed at points distant one-quarter of its length from its ends, it will vibrate according to its first even harmonic, antinodes occurring as before at the ends. A bar mounted so that its mode of vibration is not so limited by fixing the bar at certain sections can be caused to vibrate according to many frequencies without theoretical upper limit.

For a "free-free" bar transversely vibrated according to its fundamental mode, the resonant frequency is indicated by the following equation:

$$F_t = K_1 \frac{D\sqrt{q}}{L^2\sqrt{d}}$$

where D is the thickness of the bar, that is, its dimension in the direction of vibration. The other quantities are the same as in the preceding equation. The frequency accordingly is affected by two of the three dimensions of the bar and, as to the common dimension, is affected in a quite different manner than in the case of a longitudinally vibrating bar. Although the frequency is not affected by the width of the bar, this dimension does determine the driving force required to actuate the bar to a given maximum amplitude. Since theoretically the bar has as many fundamental periods as it has dimensions of cross section, it is undesirable to use bars of substantially circular or square cross-section, since it is impossible to mount the bars to entirely prevent them from vibrating according to more than one of their fundamental modes or to make them conform to these shapes accurately enough to insure that the resonant curves for these different fundamental modes shall coincide. Unless they do coincide there results effectively a single broadened curve, with consequent decrease in selectivity. It is preferable to use a rectangular section, the dimensions of which are unequal to a considerable extent.

The nodal points for a transversely vibrating bar are not a quarter of the length of the bars from each end, but .22418 of this length. The conditions for vibrations at higher frequencies are complicated and will not be considered except to say that these overtone frequencies are not true harmonics, since they are not integral multiples of the fundamental frequency. This fact makes a "free-free" bar transversely vibrated especially useful in alternating current analysis, for the reason that, since the high frequencies present in alternating current waves are necessarily integral multiples of the fundamental, by using a transversely vibrated bar the fundamental frequency of which corresponds to the fundamental frequency of the current the harmonics of the current will be prevented from vibrating the bar in its overtones.

The phenomenon of standing waves is, of course, a phase of the phenomenon of travelling waves and accordingly it will be found that if the variables of the frequency equations which have reference to the dimensions of the body are eliminated, the remaining variables, alternatively expressed, are density and elasticity, that is, those making up the expression for the velocity by propagation of sound waves through the medium. The latter occurs in the numerator and the former in the denominator. These quantities, therefore, determine the choice of material for use in frequency standards. The analogous quantities, inductance and capacity similarly determine the resonant frequency in electric circuits.

The frequency expressed by the above equations is the resonant frequency, which has been elsewhere defined. Another frequency that is sometimes used in quite similar frequency standards is the natural frequency, which has also been defined above. The equation expressing the natural frequency differs from that defining the resonant frequency by the addition of a viscosity, or resistance, term, these elements, respectively, being always present at least in some small amount in mechanically and electrically vibrating systems. Further, the natural frequency continuously changes as the vibrations "die", since on account of the temperature coefficient of the material, the viscosity or resistance is a function of the amplitude of vibration. For this reason, in order to insure greatest accuracy, the vibrating bodies used in frequency standards should be resonantly vibrated.

Aside from the question of the range of frequencies to be tested, the choice of material for mechanically vibrating standards, or the choice as between an electrically or mechanically vibrating body, is determined from considerations of frequency selectivity. The expression for this quantity involves besides the quantities above considered, the velocity or resistance. Electrical selectivity is in fact an inverse function of the quantity $\frac{R}{2L}$ which is commonly called the damping factor $\frac{\pi R}{\omega L}$ which is commonly called the logarithmic decrement (see p. 90 of Circular No. 74 of the Bureau of Standards, 2nd edition). A similar relation applies for a mechanical vibrating body. The value of the decrement for a particular case is usually derived from the resonance curve plotted between impressed frequencies including the resonant frequency and the amplitudes of the vibrations resulting therefrom, (see, for example, Morecroft's Principles of Radio Communication, page 801). Of course, there is no actual damping of the vibrations in the resonant condition of vibration under which this curve is plotted. Although obtained in the manner indicated, it actually is the decrement for a freely oscillating body when vibrating at the amplitude corresponding to the resonant frequency during the test. Since selectivity is inversely proportional to the decrement, a vibrating body or circuit having low viscosity or resistance should be chosen in order to obtain high selectivity and the body or circuit should be vibrated through as small an amplitude as is practicable. These considerations in the present instance urge the use of a mechanically vibrating body instead of an electric circuit and, depending upon the frequency desired, the use of such highly elastic materials as steel and glass.

Referring now to Figs. 1 and 2, the bar 1 is the frequency determining element. Its cross-section is rectangular for the reasons given above. If made of steel and a few inches long and having approximately the cross-section shown, the frequency for the fundamental mode will be of the order of a few thousand cycles. A set of such elements can easily be designed for frequencies within a range of many thousands of cycles immediately above that for which tuning forks can be efficiently used, and in particular through the range of frequencies commonly used in carrier current communication.

The fundamental frequency of the bar is used and the bar is supported at its nodal points to insure the minimum amount of damping on account of friction resulting from flexure of the bar. This friction would produce the same effect on damping and accordingly on selectivity as increasing the viscosity.

The bar at the nodal points rests on knife edges 3 of support 2, which in turn, is supported on stand 13 shown in Fig. 2. For the fundamental mode of vibration, as shown by dashed lines, the nodal points are at distances .22418 of the length of the bar from the ends.

The bar is electromagnetically driven by the coils 4 mounted on the horseshoe-shaped core 5. The particular assembly of coils and cores illustrated is that of an ordinary telephone receiver. The magnetic circuit is completed through the bar 1. The current is supplied by source 7 through circuit 8 which is completed through impedances 9 and circuit 10 in a manner to be described below. Device 6 with the circuits associated therewith cooperates with the circuits already described to indicate a condition of maximum amplitude of vibration of the bar, that is resonance, as the frequency of the source 7 is varied through that value. The element 6 may be an ordinary watchcase telephone receiver or any other device for translating the acoustic waves set up by the bar into corresponding electric currents. These currents are amplified if desired by a device indicated schematically by block 11 and impressed through circuit 10 on impedances 9 and circuit 8. The telephone receiver 12 is actuated by a change of potential across the outside terminals of impedances 9, this potential resulting from the joint effect, in the circuits as a whole, of the currents from source 7 and those produced by the vibrations of the bar in the receiver 6.

The operation of the circuit for resonance indication depends on the now well-known physical principle that as the frequency of the driving force approaches very close to the resonant frequency of the driven body the phases of the movements of the driven body and of the driving force are substantially coincident, that at the instant of coincidence of frequencies the phase of movement is 90° behind that of the force, and that when the frequency of the force is just above the resonance frequency, the phase of the movement has fallen back 90° more, and is, therefore, substantially opposed to the phase of the force. This 180° shift of phase occurs during a frequency interval comparable with that of the width of the resonance curve.

A mathematical statement and analysis of this phenomenon is not simple and is not necessary in this instance. It is considered briefly in an article by Larsen in the " Elektrotechnische Zeitschrift" Vol. 32, No. 12, March 23, 1911. The physical basis for it is perhaps partially suggested from the fact that when the two frequencies are exactly the same, so that neither one tends to react on and change the frequency of the other, there can be no resultant interchange of energy, which requires a quadrature relation of phases. Further, a low decrement means a high inertia to frequency change. The reason for the difference in phase relations, depending upon whether the driving frequency is above or below the resonance frequency, is suggested by the fact that in the former case the driving force tends to force the bar to vibrate in a mode different from its natural mode, while the converse is true in the latter case.

In the system illustrated there will be a momentary relative shift of phases of the potential across the respective impedances. This shift of phase is made evident in the telephone receiver 12 by adjusting the spacing between the bar and receiver 6 by screw adjusting means 14, by which receiver 6 is mounted in support 13, until the potentials across the impedances are initially displaced from each other 90° and by initially adjusting these potentials to equality. This adjustment of receiver 6 requires that the spacing be a quarter of a wave length of sound in air. For frequencies of a few thousand cycles this spacing would be a few inches. The shift of phase at the resonant frequency results in a momentary cessation of sound in the receiver 12, immediately followed by a resumption of sound, as the phase of movement first shifts to opposition with the phase of the force and then shifts 90° further to a position opposite to its initial position.

Although the 180° phase shift takes place within a frequency range approximately that of the peak of the resonance curve, the rapidity of the change in sound in receiver 12 at the resonant frequency is much greater than the change in slope of the resonance curve.

Curve A in Fig. 3 is plotted with frequencies as abscissae and the sound or resultant current in the receivers as ordinates and indicates the very great sensitivity that is possible by the use of this method as compared with methods, the sensitivity of which depends on the sharpness of the resonance curve.

Curve B of that figure shows the corresponding resonance curve. Of course, the telephone receiver 12 could be replaced by a visual indicating device such as an electrical meter with similar effect.

Fig. 4 discloses a mounting and an indicating means which are alternative to those of Figs. 1 and 2. The bar is trunnion mounted on pins fixed in supports on either side and extending a short distance into the bar at the line of intersection of the nodal cross-section and the neutral plane of flexure. This arrangement more nearly attains the ideal of an absence of a tendency to relative motion between the bar and the point of support than is the case when the mounting of Fig. 1 is used, and accordingly, decreases the damping and increases the selectivity of the bar. The conditions would be the same, so far as concerns the effect on damping, if the pins passed this bar but the change in distribution of the mass of the bar caused thereby would tend to affect the frequency characteristics of the bar.

The indicating means is similar to that suggested near the end of the discussion of Figs. 1 and 2, that is, its sensitivity is dependent on the shape of the resonance curve. The movements of the bar are translated into corresponding current variations in generator coils 15, the magnetic circuit of which comprises the permanent magnet 16, the bar 1 and the two air gaps, the reluctance of this circuit being varied as the width of the air gaps is varied by the vibrating bar. Flux may be produced in the magnetic circuit by other means than that disclosed, for example, by using a supplemental polarizing winding on the core or by inserting a polarizing source in series with the coils.

The alternating current generated in the coils 15 is amplified and rectified by device 17 and the amplitude of the rectified current is indicated by direct current meter 18, a maximum reading indicating a condition of resonance.

The mounting of the bar in Fig. 5 is similar to that of Fig. 1. The driving means is similar to that of Figs. 1 and 4, except that the violence of the vibrations is increased by applying magnetic traction simultaneously to the bar at three different points, the correct phasing of the respective tractions being insured by the proper location of the points with respect to the fulcrums or points of support. A non-electric indicator means, namely, a stethoscope 19, is used to indicate resonance. This is probably the most simple of the indicating means so far described and perhaps has some advantage in that it loads the bar to a somewhat less extent and, therefore, reduces the damping proportionally. However, its action is less positive and sensitive than some of the other means described.

In the driving arrangements above described double pole driving magnets are used, the magnetic circuits being completed through the portions of the bar immediately opposed thereto. In the arrangements of Figs. 6 and 7 single pole magnets 20 are used, the magnetic circuit of each magnet passing from one of its poles, through the bar, through the supports for the bar and magnets, to the other pole. The arrangement of Fig. 7 employs the principle utilized in the arrangement of Fig. 5 for increasing the violence of vibration. No indicating means is shown in Fig. 7, it being understood that any of the means disclosed in other figures may be used.

Fig. 6 discloses a visual indicating means comprising the microscope 21. The microscope is set so as to include the edge, or other reference point, of the bar throughout its excursion, in which case the condition of maximum amplitude is readily apparent or, if the microscope is of the measuring type, may be accurately measured.

Figs. 8, 9 and 10 illustrate the application of the principles above described to longitudinally vibrated bars. The arrangement of Fig. 8 corresponds to that of Fig. 4 and operates in the same manner except for the difference in the character of the vibrations produced.

Fig. 10 illustrates a method of obtaining relatively high frequencies in an arrangement otherwise the same as that of Fig. 8. The bar is mounted so as to tend to create nodal points one-quarter of the length of the bar from the ends. Accordingly, the bar is caused to vibrate at its first overtone.

The arrangement of Fig. 9 differs essentially from that of Figs. 8 and 10 in that electrostatic traction is used to drive the bar and to generate current variations proportional to the amplitude of its vibrations. For this purpose the ends 23 of the support 2 are made of conducting material and are separated from the remainder of the support by insulating segments 22. The parts 23 with the ends of the bar form electrostatic condensers. The difference of potential is applied from source 7 across one condenser to drive the bar. The vibrations of the bar set up corresponding variations of potential across the terminals of the other condenser which is polarized by direct current source 24.

Although in Figs. 8, 9 and 10 trunnion mountings are disclosed, knife edge mountings as in Fig. 1, for example, may be used. The choice as between these types of mountings is not determined primarily from considerations of damping as in the case of transversely vibrating bars, but from considerations of portability, accuracy and permanency of adjustment, etc. Similarly, since the frequency of the bars is not a function of the shape or dimensions of the cross-section, it is relatively immaterial as to the shape or size of section of the bars used.

The frequency standards arranged for longitudinal vibrations are in general adapted to be resonant at higher frequencies than those arranged for transverse vibrations. This appears from the equation of frequency above and the accompanying description. A frequency of 10,000 cycles per second may be obtained with a bar about twenty-five centimeters long when vibrated in its fundamental mode. Frequencies as high as 50,000 cycles per second are readily obtainable, using somewhat shorter bars.

It should be noted that Figs. 1 to 10 disclose two essentially different driving and generator means, that is, electromagnetic and electrostatic, and several variations of the means for applying the driving electromagnetic forces. They also disclose several different means for mounting the bars and for indicating a condition of resonance of the bars. It is to be understood that any frequency standard whether comprising a transversely or longitudinally vibrating bar, may use any desired combination of these various means, that is, that the various means disclosed for performing each of the different functions are alternatives of each other.

Particular advantages have been found to result from the use of electromagnetic driving means and electrostatic generator means, since thereby there is avoided the direct coupling that would exist if both of such means were either electromagnetic or electrostatic. This is, of course, a special case illustrating the general principle that the types of elements combined in the standard should be such that the response in the indicating device should be due wholly to the variations transmitted through the mechanically vibrating element. Fig. 11 illustrates the specific case above mentioned. The particular elements are similar to those disclosed in other figures and are similarly labeled, accordingly a detailed description is unnecessary. The condenser is constituted by conductive element 23 and the adjacent portion of the bar. Element 23 is insulated from its supporting structure by insulation 22. The supporting structure may be similar to the supporting structure for the telephone receiver of Fig. 2 and may similarly include a micrometer adjusting means like device 14 of that figure.

By the arrangements of Figs. 1 to 11, it has been found that the frequency of electrical variations supplied by a given source can be accurately set to one part in 10,000 or better.

Figs. 12 and 13 illustrate frequency standards employing bars of transparent, isotropic, elastic material, for example, glass. The arrangements of these figures also employ novel indicating means which are made possible by the use of this particular material.

The operation of these standards depends upon the principle that certain materials, for example, glass which are ordinarily isotropic become non-isotropic when elastically strained. For the present purposes a material is isotropic when it is capable of transmitting light with equal velocity in all directions.

Referring to Fig. 13 the bar 1, the light source 25 and Nicol prisms 26 and 27 are initially so related that light passes from source 25 through prism 26 and axially along the bar 1 to prism 27. Prism 26 polarizes the light in one direction in the transverse plane. Prism 27 is "crossed" with respect to prism 26 so as to be opaque to the light emergent therefrom, which light is unaffected by the bar in its quiet state. When the bar is set into vibration by magnetic traction between double pole core 29 of coil 28 and magnetic bar or plate 30 attached to the bar, it becomes non-isotropic. The result is that the plane polarized light from prism 26 instead of being transmitted through the bar without change becomes elliptically polarized therein. Accordingly, with the above described initial adjustment of the prisms a certain amount of light passes through the second prism when the bar is vibrated. The amount of emergent light is proportional to the strain and is therefore most pronounced at the edges of the bar. A dark line remains along the center or neutral plane of flexure. When the bar is resonantly vibrated the light becomes plainly visible at the edges. The increase in the amount of light at the resonant frequency is sufficient to make the condition of resonance readily apparent.

Fig. 12 illustrates a similar arrangement in which the bar is longitudinally vibrated. Only so much of the structure as is necessary in view of Fig. 13 is disclosed. The particular driving magnet arrangement is the same as that of Fig. 8 for example, and is similarly labeled. The alternative specific type of driving arrangement of Fig. 13, or of any of the other figures including electrostatic means, may equally well be used. Electrostatic driving means may also be used in the standard of Fig. 13.

Although considerably more energy is required in order to strain the structure of the bar sufficiently to restore an appreciable amount of light as compared with the arrangement using transversely vibrating bars, the arrangement shown in Fig. 12 has advantages over that shown in Fig. 13, since the bar can be more easily caused to vibrate at its higher harmonic rates.

If the bars are set into vibration so that the nodes are about five millimeters apart, as is easily possible, the bar vibrates at a frequency greater than one hundred kilocycles. The frequency can be easily determined by counting the number of nodes, if the elastic properties of the material are known. In order that the bar may be caused to vibrate at these higher frequencies, it should not be rigidly mounted as in the other figures. The nodal points in this modification are the points of greatest strain and therefore the points where the intensity of emergent light is the greatest.

If the bar, instead of being made of isotropic material, is cut from a uniaxial or biaxial transparent crystal and if the light is passed through the bar in a direction parallel to one of the optic axes, the light may be extinguished by crossing the Nicol prisms. If the bar is set into vibration piezo-electrically, a very violent succession of strains is developed. The result is that the optic axes of the crystal oscillate back and forth intermittently letting the light through. Thus it is very easy to tell when the bar is in resonance. This is true both of longitudinally and transversely vibrated bars.

It is to be understood that in this specification and in the claims the term "electrical variations" when unqualified is descriptive of electromagnetic, electrostatic or any other kind of variation usually associated with electric phenomena. "Electric coupling" will be similarly understood as including both magnetic, electrostatic, and the like, couplings.

What is claimed is:

1. A frequency selective transmission system comprising two mutually independent electric circuits, a vibratory mechanical element and means for separately and reciprocally coupling said element to said circuits, comprising electromagnetic coupling means for one circuit and electrostatic coupling means for the other circuit.

2. A frequency selective transmission system comprising two mutually independent electric circuits, a vibratory mechanical element and means for separately and reciprocally coupling said element to said circuits, said means including means preventing electric coupling between said circuits.

3. A frequency standard comprising an elastic bar mounted for "free-free" vibrations.

4. A frequency standard comprising an elastic bar, supporting means therefor, and means for producing standing transverse vibrations therein, said bar and supporting means being mounted in "free-free" relation.

5. A frequency standard comprising an elastic bar, supporting means therefor, and means for setting up longitudinal standing waves therein, said bar being mounted in "free-free" relation with respect to said supporting means.

6. A mechanical frequency standard comprising a bar having low viscosity and a substantially rectangular cross section, the principal dimensions of its cross section being such as to cause the bar to vibrate at materially different frequencies in the direction of such dimensions.

7. A frequency standard comprising an elastic bar, means for setting up transverse standing vibrations therein, and supporting means at nodal cross sections of vibration thereof.

8. A frequency standard comprising an elastic bar, means for setting up transverse standing vibrations of fundamental mode therein, and supporting means at the nodal cross sections of vibration.

9. A frequency standard comprising an elastic bar, means for setting up longitudinally standing vibrations therein, and supporting means at at least one of the nodal cross sections of vibration.

10. A frequency standard comprising an elastic bar, means for setting up transverse standing waves therein, and supporting means at the intersections of at least two of the nodal cross sections and the neutral plane of flexure.

11. A frequency standard comprising a free-free elastic bar, and means for causing it to vibrate at its resonant frequency.

12. A method of setting the frequency of current from a given source at a given value using a mechanically vibrating frequency standard whose resonant frequency has the given value, which comprises vibrating said standard by and in accordance with said current while supporting said standard in free-free relation, and varying the frequency of said current until the vibrations of said standard have the maximum value.

13. A frequency standard comprising a "free-free" elastic bar, supporting means at at least two of the nodal cross sections of transverse vibration, and means for applying periodically varying traction simultaneously at points intermediate the points of support and adjacent the ends, in such directions respectively as to be additive with respect to the resultant strains of said bar.

14. In combination, a "free-free" elastic bar mounted at certain of its nodal cross sections of vibration, means for harmonically actuating said bar into vibration by and in accordance with electrical variations, and means for producing a sensible indication by and in proportion to the amplitude of vibration of said bar.

15. In combination, a "free-free" elastic bar mounted at certain of its nodal cross sections of vibration, electromagnetic driving means therefor, and means for producing a sensible indication by, and in proportion to, the amplitude of vibration of said bar.

16. In combination, a "free-free" elastic bar mounted at certain of its nodal cross sections of vibration, electrostatic driving means therefor, and means for producing a sensible indication by, and in proportion to, the amplitude of vibration of said bar.

17. In combination, a "free-free" elastic bar mounted at certain of its nodal cross sections of vibration, means for harmonically actuating said bars into vibrations by and in accordance with electrical variations and electromagnetic pick up means for translating the movements of said bar into corresponding variations of current, and means for indicating a maximum amplitude of said current.

18. In combination, a "free-free" elastic bar mounted at certain of its nodal cross sections of vibration, means for harmonically actuating said bars into vibrations by and in accordance with electrical variations and electrostatic means for translating the vibratory movements of said bar into corresponding variations of electric potential, and means for indicating a maximum variation of said potential.

19. In combination, a "free-free" elastic bar mounted at certain of its nodal cross sections of vibration, means for harmonically actuating said bars into vibrations by and in accordance with electromagnetic variations and electrostatic means for translating the vibratory movements of said bar into corresponding variations of electric potential, and means for indicating a maximum variation of said potential.

20. In combination, a "free-free" elastic bar mounted at certain of its nodal cross sections of vibration, means for harmonically actuating said bar into vibration by and in accordance with electrical variations, and stethoscopic pick up means for indicating the condition of maximum amplitude of vibration of said bar.

21. In combination, an elastic bar, means involving harmonic electrical variations of variable frequency for driving said bar, means for translating the movements of said bar into corresponding electrical variations of the same kind as that first mentioned, and means conjointly affected by said electrical variations for indicating relative changes of phase of said variations.

22. In combination, an elastic bar mounted for "free-free" vibrations, alternating current responsive means for driving said bar, means for varying the frequency of said current, means for picking up the acoustic waves set up by the vibrations of said bar, means for translating said acoustic vibrations into corresponding electric current, and means conjointly responsive to said electric currents for indicating changes in their relative phases as the frequency of the driving current is varied through the resonance frequency of the bar.

23. The method of setting the frequency of alternating currents supplied by a given variable frequency source to coincidence with the resonant frequency of a mechanically vibrating body which comprises causing forced vibrations in said body by said current, translating the resultant movements of said body into corresponding current variations, and indicating the 180° phase shift of said current variations relative to the variations of the driving current as the frequency of the driving current is varied through the resonance frequency of said body.

24. The method of measuring the frequency of harmonic strain producing forces applied to a transparent elastic medium which is normally isotropic but which is non-isotropic when elastically strained, employing a source of light waves, a polarizing medium, and an analyzing medium, which consists in passing light waves from said source through the polarizing medium, the elastically strained medium, and the analyzing medium thereby making visible the nodal and antinodal cross sections of vibration in said elastic medium.

25. The method of setting the frequency of alternating currents supplied by a given variable frequency source to coincidence with a resonance frequency of a mechanically vibrated glass rod, employing a source of light waves, a polarizing medium, and an analyzing medium, which consist in periodically straining said rod in accordance with said current, simultaneously passing light from said source in sequence through the polarizing medium, the rod, and the analyzing medium, said mediums being placed so that in the unstrained condition of the rod no light is emergent from the analyzing medium, and varying the frequency of said current until a resonant condition of vibration for a desired mode of vibration is indicated by a maximum intensity of emergent light at intervals along the rod corresponding to the desired mode of vibration.

26. A frequency standard comprising a transparent elastic normally isotropic medium, means for periodically straining said medium in accordance with electrical variations thereby making said medium non-isotropic, and a source of light and two crossed Nicol prisms arranged rectilinearly and in such relation to the medium that polarized light from one Nicol prism passed through the medium to the other Nicol prism.

In witness whereof, I hereunto subscribe my name this 27th day of June A. D., 1924.

NORMAN H. RICKER.